United States Patent
Schneuwly

(10) Patent No.: US 7,580,243 B2
(45) Date of Patent: Aug. 25, 2009

(54) METHOD OF MAKING AND ARTICLE OF MANUFACTURE FOR AN ULTRACAPACITOR ELECTRODE APPARATUS

(75) Inventor: Adrian Schneuwly, Schmitten (CH)

(73) Assignee: Maxwell Technologies, Inc., San Diego, CA (US)

( * ) Notice: Subject to any disclaimer, the term of this patent is extended or adjusted under 35 U.S.C. 154(b) by 145 days.

(21) Appl. No.: 11/457,651

(22) Filed: Jul. 14, 2006

(65) Prior Publication Data

US 2008/0013255 A1    Jan. 17, 2008

(51) Int. Cl.
    *H01G 9/00*    (2006.01)
(52) U.S. Cl. ..................... 361/502; 29/25.03
(58) Field of Classification Search ......... 361/502–503; 29/25.03
See application file for complete search history.

(56) References Cited

U.S. PATENT DOCUMENTS

| | | | |
|---|---|---|---|
| 4,233,377 A | 11/1980 | Haering et al. | |
| 5,824,435 A | 10/1998 | Kawano et al. | |
| 5,907,472 A | 5/1999 | Farahmandi et al. | |
| 6,097,587 A * | 8/2000 | Inagawa et al. | 361/502 |
| 6,134,760 A * | 10/2000 | Mushiake et al. | 29/25.03 |
| 6,341,058 B1 * | 1/2002 | Sakata et al. | 361/502 |
| 6,680,141 B2 | 1/2004 | Hikmet et al. | |
| 6,885,545 B2 | 4/2005 | Michel et al. | |
| 7,236,349 B2 * | 6/2007 | Miyaki et al. | 361/502 |
| 2003/0035262 A1 * | 2/2003 | Ikeda et al. | 361/502 |
| 2005/0128684 A1 * | 6/2005 | Miyaki et al. | 361/502 |
| 2005/0162812 A1 * | 7/2005 | Katai et al. | 361/502 |
| 2008/0014504 A1 | 1/2008 | Schneuwly | |

FOREIGN PATENT DOCUMENTS

| JP | 01152715 A | * | 6/1989 |
|---|---|---|---|
| JP | 02098914 A | * | 4/1990 |
| JP | 03283523 A | * | 12/1991 |
| JP | 04022117 A | * | 1/1992 |
| JP | 05304050 A | * | 11/1993 |
| JP | 05326330 A | * | 12/1993 |
| JP | 08287970 A | * | 11/1996 |

* cited by examiner

*Primary Examiner*—Eric Thomas
(74) *Attorney, Agent, or Firm*—Oppedahl Patent Law Firm LLC

(57) ABSTRACT

An electrode structure adapted for use in a ultracapacitor energy storage device, which expedites electrode drying time and improves impregnation of the electrode structure, is disclosed. In one embodiment, the electrode structure comprises a carbon film element having a plurality of cavities disposed thereon. In another embodiment, a plurality of channels is punched into a carbon film element of the electrode structure.

15 Claims, 5 Drawing Sheets

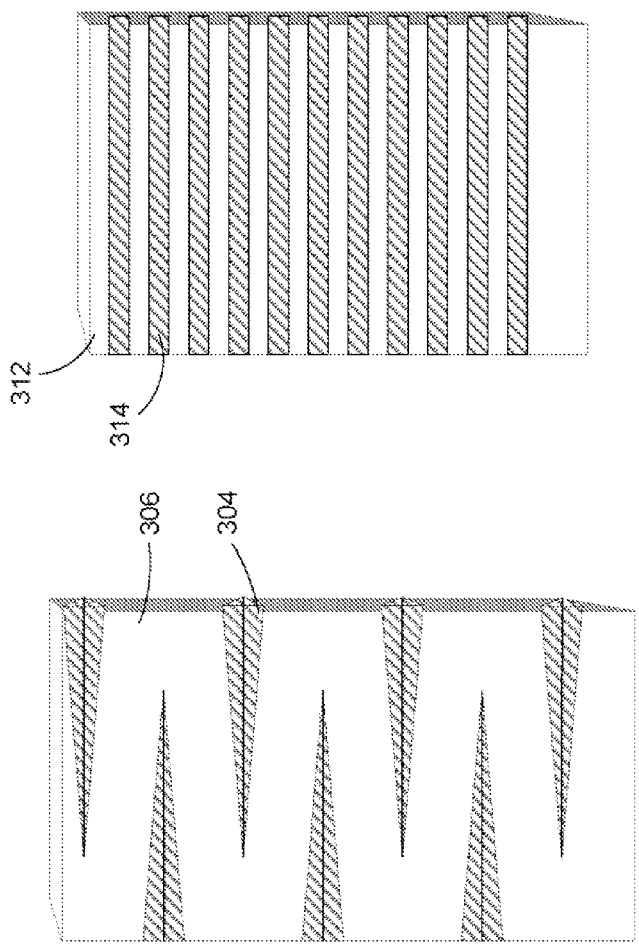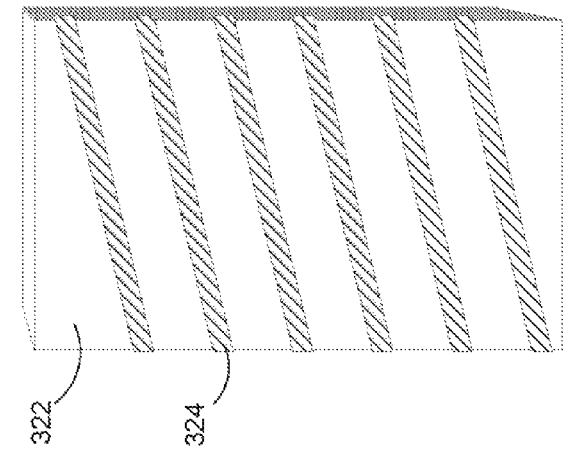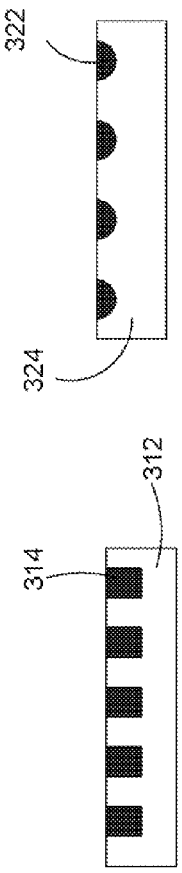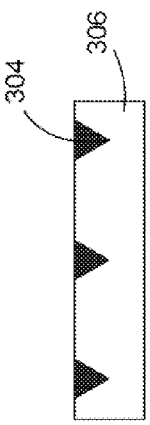

US 7,580,243 B2

METHOD OF MAKING AND ARTICLE OF MANUFACTURE FOR AN ULTRACAPACITOR ELECTRODE APPARATUS

BACKGROUND

1. Field

The disclosed method of making and article of manufacture relates generally to electrode apparatuses, and particularly to electrode apparatuses adapted for use in an energy storage device, such as for example in a capacitor or a battery.

2. Related Art

Energy storage is a major issue in the modern technological marketplace. Efficient delivery of energy (or power) is a related major issue. Batteries have historically played a major role in energy storage solutions. A battery is a device that stores electric charge for use as a power source. The charging process is based on a chemical reaction that takes place between an electrolyte and two electrodes called an anode and cathode. The capacity to store electric charge is a function of the surface area of these electrodes and the particular electrolyte used. Common types of batteries include sealed lead acid ("SLA") batteries, nickel-cadmium ("Ni—Cd") batteries, and litium-ion ("Li-Ion") batteries. SLA batteries can hold a charge for up to three years and are generally used to provide backup power during emergencies. Ni—Cd batteries provide a fast, even energy discharge and are most often used to power appliances and audio and video equipment. Li-Ion batteries have the highest energy storage capacity (generally twice the capacity of Ni—Cd batteries) and are used to power portable computers, cellular phones, and digital cameras to name a few applications.

Another type of battery known as a double-layer capacitor stores energy based on a microscopic charge separation that takes place at an electrical-chemical interface between an electrode and electrolyte, The capacitor is charged by a primary energy source and then discharged when connected to a device to be powered, generally referred to as a load. The charging and discharging process is repeatable; that is, after discharging takes place through the load the capacitor may be recharged by connecting its electrodes to the primary energy source. Double-layer capacitors have been used to power a myriad of bulk electronic devices including radios, motors, and the like.

Double layer capacitors, also referred to as electrochemical double layer capacitors, are energy storage devices that are able to store more energy per unit weight and unit volume than traditional capacitors. Additionally, they can typically deliver the stored energy at a higher power rating than rechargeable batteries.

There is a continuing need for improved double layer capacitor design. Such improved double layer capacitors need to deliver large amounts of useful energy at a very high power output and energy density ratings within a relatively short period of time. Such improved double layer capacitors should also have a relatively low electrode equivalent series resistance (ESR) and yet be capable of yielding a relatively high operating voltage.

An ESR rating for a capacitor is a rating of quality. A theoretically perfect capacitor would have an ESR of zero. However, all real capacitors have some amount of ESR. Hence, a real-world challenge for capacitor designers is minimizing ESR. ESR is modeled like a resistor in series with a capacitor. Capacitor designs that appear optimally functional in theory, can fail when manufactured due to ESR. Increasingly, modern electronic designs rely on low ESR capacitors to function optimally in a real-world environment.

Double layer capacitors consist of two porous electrodes that are isolated from electrical contact by a porous separator. Both the separator and the electrodes are impregnated with an electrolytic solution. This allows ionic current to flow between the electrodes through the separator at the same time that the separator prevents an electrical or electronic (as opposed to ionic) current from shorting the cell. Coupled to the back of each of the active electrodes is a current collecting element. One purpose of the current collecting element is to reduce ohmic losses in the double layer capacitor.

Drying time and electrolytic solution impregnation efficiency of an ultracapacitor electrode are key processes during ultracapacitor manufacturing. Both processes are crucial for longer lifetime and reduced manufacturing cost of ultracapacitor products Therefore, the present teachings provide a method of making and article of manufacture for an energy storage apparatus, which reduces electrode drying time and improves electrolytic solution impregnation efficiency during a manufacturing process, while simultaneously reducing the cost associated with such manufacture and expediting the process.

SUMMARY

In one embodiment of the present teachings, a method of making an electrode apparatus, adapted for use in an ultracapacitor energy storage device interface is disclosed. The method of making the electrode apparatus, comprises the steps of forming a first carbon film element, having a top side and a bottom side, wherein the first carbon film element has a predetermined thickness associated therewith; punching the first carbon film element thereupon the top side, such that a plurality of cavities are disposed thereon the top side, wherein the plurality of cavities have a predetermined depth associated therewith; forming an electrode foil element having a first side and a second side, affixing the first carbon film element onto the electrode foil element, such that the bottom side of the first carbon film element is affixed to the first side of the electrode foil element.

In one embodiment of the present teachings, an electrode structure adapted for use in an ultracapacitor energy storage device is disclosed. The electrode structure comprises a first carbon film element, having a top side and a bottom side, wherein the first carbon film element has a predetermined thickness associated therewith; a plurality of cavities disposed upon the top side of the first carbon film element, wherein the plurality of cavities has a predetermined depth associated therewith, and; an electrode foil element, having a first side and a second side, wherein the first carbon film element bottom side is affixed to the first side of the electrode foil element.

In one embodiment of the present teachings, an article of manufacture comprising an electrode apparatus adapted for use in an ultracapacitor energy storage device is disclosed. The article of manufacture comprising a first carbon film element comprising, a top side, a bottom side, a predetermined thickness, a plurality of cavities disposed upon the top side of the first carbon film element, wherein the plurality of cavities has a predetermined depth; an electrode foil element having a first side and a second side, wherein the first carbon film element bottom side is operatively connected to the first side of the electrode foil element, and; a second carbon film element comprising, a top side, a bottom side, a predetermined thickness, a plurality of cavities disposed upon the bottom side of the second carbon film element, wherein the second carbon film element top side is operatively connected to the second side of the electrode foil element.

BRIEF DESCRIPTION OF THE DRAWINGS

Embodiments of the disclosed method and apparatus will be more readily understood by reference to the following figures, in which like reference numbers and designations indicate like elements.

FIG. 3A illustrates a top plan view of an article of manufacture of one embodiment of an energy storage electrode apparatus according to the present teachings.

FIG. 3B illustrates a side plan view of the article of manufacture of the embodiment of FIG. 3A, according to the present teachings.

FIG. 3C illustrates a top plan view of an article of manufacture of an alternate embodiment of an electrode apparatus, according to the present teachings.

FIG. 3D illustrates a side plan view of the article of manufacture of the embodiment of FIG. 3C, according to the present teachings.

FIG. 3E illustrates a top plan view of an article of manufacture of another alternate embodiment of an electrode apparatus, according to the present teachings.

FIG. 3F illustrates a side plan view of the article of manufacture of the embodiment of FIG. 3E according to the present teachings.

DETAILED DESCRIPTION

Figure 1:
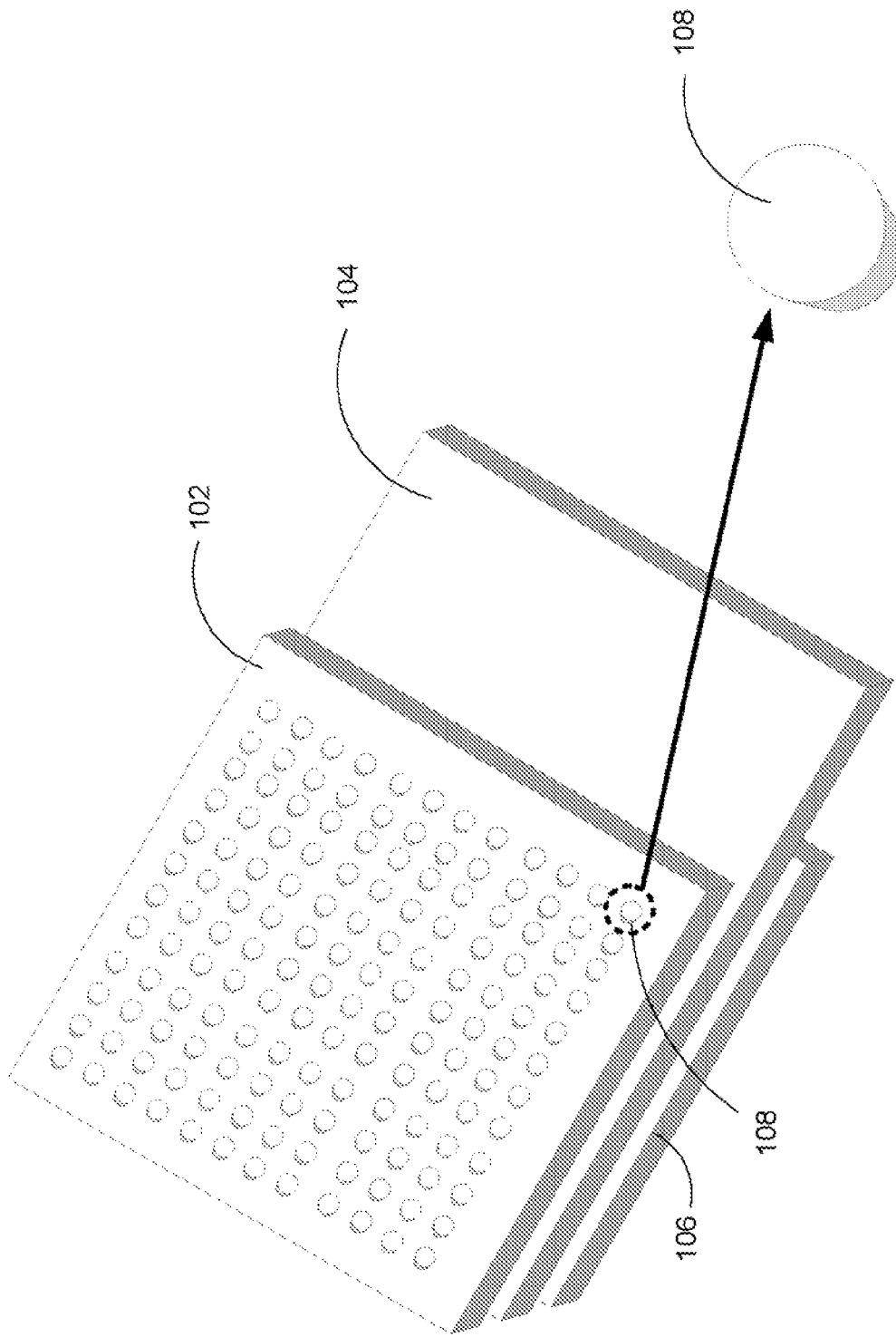
FIG. 1A illustrates a perspective view of one embodiment of an energy storage electrode apparatus, according to the present teachings.
Figure 5:
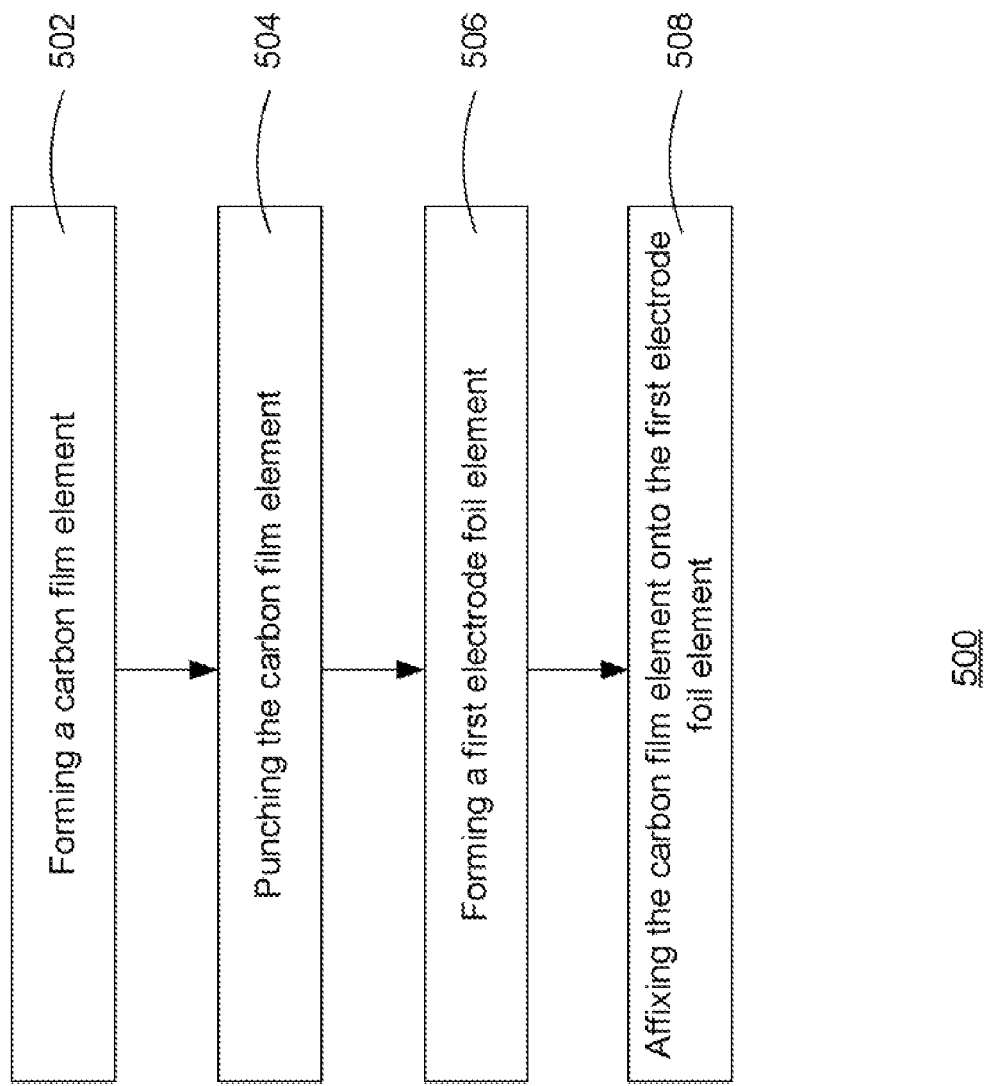
FIG. 5 illustrates a method of making an energy storage electrode apparatus, according to the present teachings.

Referring generally to FIG. 1 and FIG. 5, a method of making an electrode apparatus 100, adapted for use in an ultracapacitor energy storage device interface is disclosed. As will be described in more detail below, the method of making generally comprises the steps of forming a first carbon film element, punching the first carbon film element, forming an electrode foil element, and affixing the first carbon element onto the electrode foil element. At a first STEP 502 of forming a first carbon film element 102, a top side and a bottom side are of the first carbon film element 102 are formed, as illustrated in FIG. 1. Between the top side and the bottom side of the first carbon film element 102 is a distance comprising a predetermined thickness of the first carbon film element 102. At a next STEP 504 of punching the first carbon film element 102 on the top side, a plurality of cavities 108 are punched into the first carbon film element 102, wherein each of the plurality of cavities 108 has a predetermined depth. In one embodiment, the predetermined thickness of the first carbon element 102 is greater than the predetermined depth of the plurality of cavities 108. In another embodiment, the predetermined thickness of the first carbon film element 102 is equal to the predetermined depth of the plurality of cavities 108.

In a next STEP 506 of forming an electrode foil element, a first electrode foil element 104 is formed, having, a first side and a second side. The first side of the first electrode foil element 104 is operatively coupled to the bottom side of the first carbon film element 102 as will now be described. In one embodiment, the first electrode foil element 104 is composed of aluminum.

In a final STEP 508 of affixing the first carbon film element 102 onto the electrode foil element 104, the bottom side of the first carbon film element 102 is affixed onto the first side of the electrode foil element 104.

As described, in one illustrative exemplary embodiment, the plurality of cavities 108 are punched into the first carbon film element 102, prior to affixing the first carbon film element 102 onto the first electrode foil element 104, such as for example during the extrusion of the milled carbon-polymer material, when the carbon film gets a structure. In this embodiment, small holes (cavities) are punched through (or partially through) the carbon film electrode. In one alternate embodiment of the present teachings, the plurality of cavities 108 may optionally be punched into the first carbon film element 102 after the first carbon film element 102 has been affixed to the electrode foil element 104.

In one embodiment, the plurality of cavities 108 is generally of circular shape and extends cylindrically into the first carbon film element 102. However, in alternate embodiments of the present teachings, the shape of the plurality of cavities 108 may be triangular or rectangular.

Figure 2:
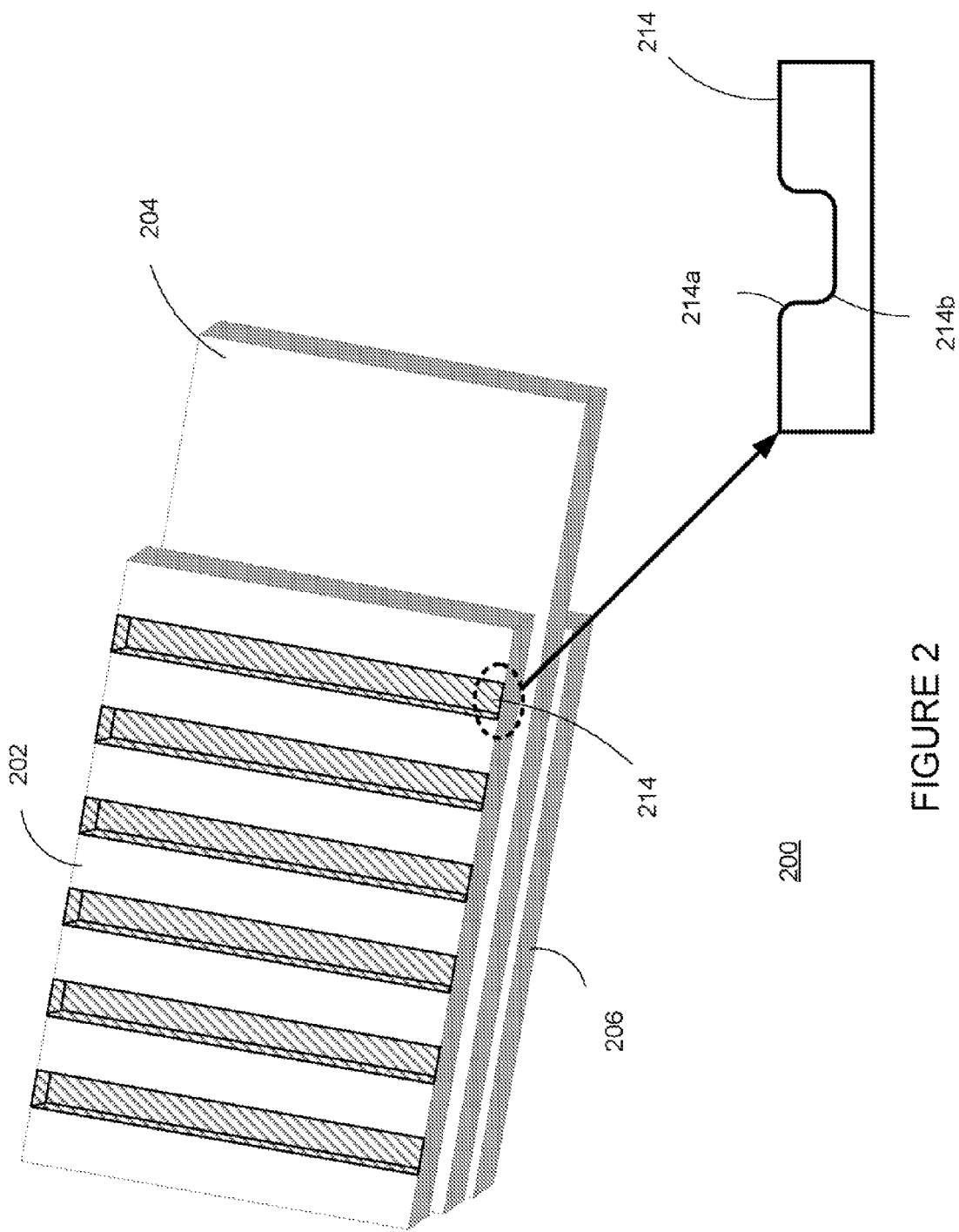
FIG. 2 illustrates a perspective view of one embodiment of an energy storage electrode structure, with a partial exploded view, according to the present teachings.

As shown in FIG. 2, a perspective view of one embodiment of an energy storage electrode structure 200, according to the present teachings. In the illustrative exemplary embodiment, a rectangular structure 214 is punched into the carbon film during a calendaring process to create "channels" at the surface of the carbon film element 202. As shown in the exemplary embodiment, an upper inner edge 214a and a lower inner edge 214b are slightly rounded, or chamfered.

One embodiment, as shown in FIG. 3A (top plan view) and FIG. 3B (side plan view), an energy storage electrode apparatus 302, according to the present teachings is disclosed. In this embodiment, triangular shaped channels 304 are punched into a carbon film element 306, either prior to affixing the carbon film element 322 to the first electrode foil element 104 during the extrusion process, or after the carbon film element 322 is affixed to the first electrode foil 104.

One embodiment, as shown in FIG. 3C (top plan view) and FIG. 3D (side plan view), an energy storage electrode apparatus 310, according to the present teachings is disclosed. In this embodiment, rectangular shaped channels 314 are punched into a carbon film element 312 either prior to affixing the carbon film element 322 to the first electrode foil element 104 during the extrusion process, or after the carbon film element 322 is affixed to the first electrode foil element 104.

One embodiment, as shown in FIG. 3E (top plan view) and FIG. 3F (side plan view), an energy storage electrode apparatus 320, according to the present teachings is disclosed. In this embodiment, semi-circular shaped channels 324 are punched into a carbon film element 322, either prior to affixing the carbon film element 322 to the first electrode foil element 104 during the extrusion process, or after the carbon film element 322 is affixed to the first electrode foil 104.

Electrode foils employing carbon film elements are well-known in the art, as exemplified in U.S. Pat. Nos. 6,842,330; 6,585,152; 6,451,073; 6,449,139; 6,430,031; 6,233,135; 6,094,788; 5,907,472; 5,862,035 and are incorporated by reference in their entirety as if disclosed in full.

In one embodiment, the plurality of cavities 108 (or channels) functions to minimize drying time for the carbon film element 102. As will be appreciated by those of skill in the art, carbon film drying time is a major issue in electrode design, due to factors such as additional manufacturing time necessitated by drying carbon film electrodes. Additional manufacturing time increases costs associated with manufacture of such devices, such as for example manpower, facilities costs, and higher drying temperature. The present disclosure teaches how to minimize drying time and therefore minimizing such associated costs.

Also, liquid compounds, such as for example water, must be allowed to evaporate from the carbon film, prior to use. Therefore, any process which expedites carbon film drying time also contributes to minimizing manufacturing time. The present teachings expedites such drying time of the carbon film electrodes, hence minimizes an associated manufacturing time, thereby also reducing cost. Also, employing the present teachings, lower temperatures are used to perform evaporation of liquid compounds in the process of manufacturing, thereby saving costs associated with using higher temperatures for drying.

In one embodiment, the plurality of cavities 108 functions to facilitate more thorough drying and faster impregnation of the electrode apparatus 100. As will be appreciated by those of ordinary skill in the art, more efficient drying of the carbon film element 102 results in a longer life of the product, because fewer impurities remain. Also, faster impregnation of the electrode apparatus 100 results in decreased manufacturing time, and therefore lowers manufacturing costs thereby.

In one embodiment of the present disclosure an electrode structure 100, adapted to facilitate escape of gases formed during use of the electrode structure 100 is disclosed. In one variation of this embodiment a plurality of cavities 108 functions to facilitate gases escaping from the electrode structure 100 during use. During use, gases are produced inside the electrode structure 100, thereby causing stress on the electrode structure 100 and decreasing useful a span of life for the electrode structure 100. By providing a means of escape for the gases, such gases are released from the electrode apparatus 100, thereby decreasing stress and increasing a useful lifetime of the electrode structure 100. As previously described, gases produced inside the electrode structure have a detrimental effect on the electrode structure 100. In one alternate embodiment, a plurality of channels 304, 314, or 322, as shown in the illustrative exemplary embodiments of FIGS. 3A-3F function to facilitate gases escaping from the electrode structure 100.

In one embodiment, an electrode structure 100 adapted to increase a useful lifetime of a capacitor or battery apparatus is disclosed. In this embodiment, a plurality of cavities 108 is disposed in a carbon film element 102. In one variation of this embodiment, a plurality of channels 304, 314, and 322 are disposed in the carbon film element 102. In this embodiment, the plurality of cavities 108 function to reduce an equivalent series resistance ("ESR") of the electrode apparatus 100, due in part to an electrically "thinner" electrode apparatus 100. That is, there is effectively less resistive material in the carbon film element 102 to provide resistance to internal electrical pathways (not shown), due to the plurality of cavities 108 or the plurality of channels 304, 314, and 322.

Additionally, a more stable ESR over the electrode structure 100 lifetime is achieved by the present teachings, because less impurities will be retained in the manufacturing process.

Figure 4:
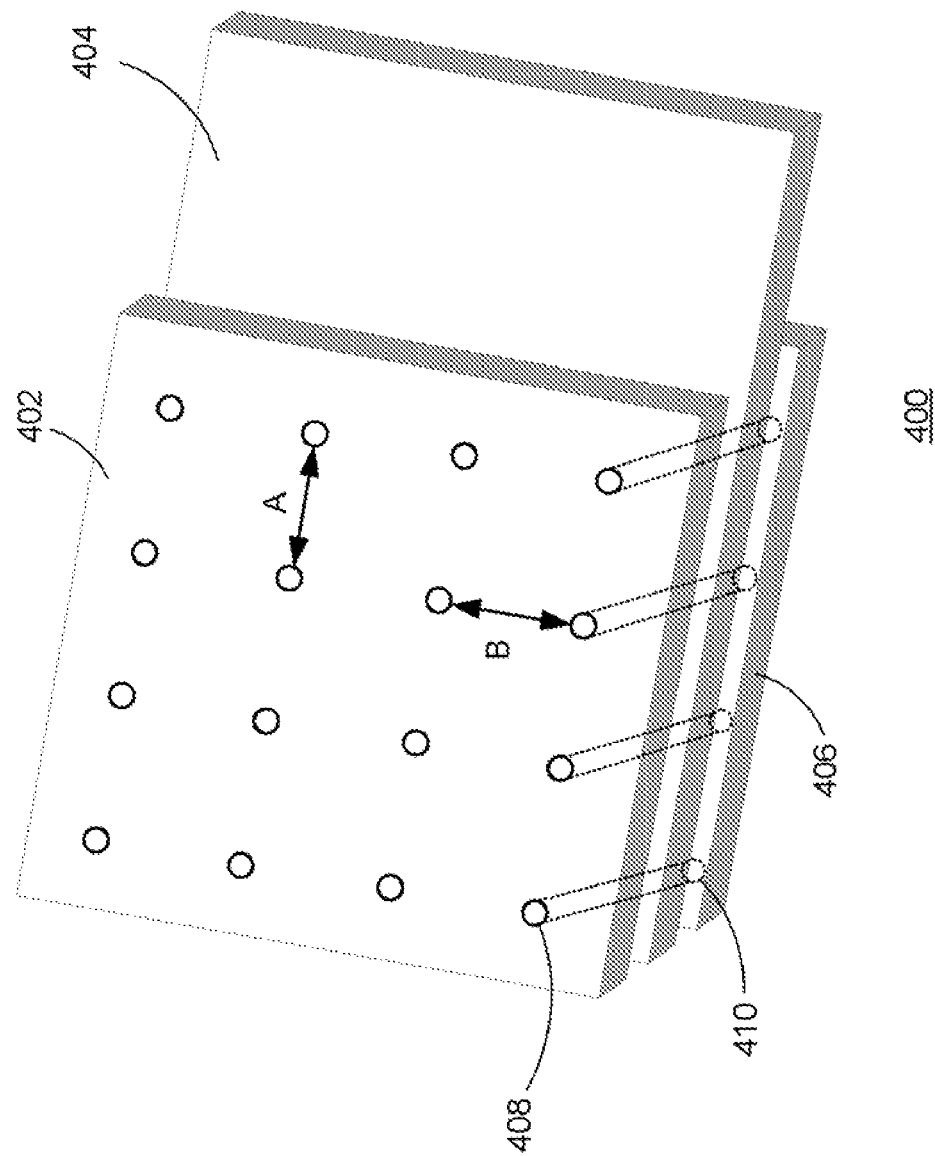
FIG. 4 illustrates a perspective view of an energy storage electrode apparatus of one embodiment, according to the present teachings.

As shown in FIG. 4, an energy storage electrode apparatus 400 of one embodiment, according to the present teachings is illustrated. In this embodiment, a first carbon film element 402 is formed and affixed to an electrode foil 404 such as for example an aluminum electrode foil. Next, a second carbon film element 406 is formed and affixed to the electrode foil 404, to form the energy storage electrode apparatus 400, as shown. In this embodiment, a plurality of cavities 408 are punched through the first carbon film element 402, through the electrode foil 404, and also through the second carbon film element 406. Providing this particular structure for the energy storage electrode apparatus 400 facilitates and expedites an electrode drying process and also facilitates impregnation of the energy storage electrode apparatus 400. That is, lower temperatures are required, because evaporation of liquids is facilitated by the plurality of cavities 408; less drying time is required for the energy storage electrode apparatus 400; impregnation of the energy storage electrode apparatus 400 is improved, because electrolyte can more readily penetrate into the energy storage electrode apparatus 400 due to the plurality of cavities 408.

The present teachings are readily adapted for use in any energy storage device such as for example a capacitor or a battery.

CONCLUSION

The foregoing description illustrates exemplary implementations, and novel features, of aspects of a method of making an apparatus for effectively providing a energy storage electrode apparatus, which improves equivalent series resistance stability over the electrodes lifetime, decreases drying time, improves impregnation of a carbon film element, lowers cost, and improves production throughput. Given the wide scope of potential applications, and the flexibility inherent in electro-mechanical design, it is impractical to list all alternative implementations of the method and apparatus. Therefore, the scope of the presented disclosure should be determined only by reference to the appended claims, and is not limited by features illustrated or described herein except insofar as such limitation is recited in an appended claim.

While the above description has pointed out novel features of the present teachings as applied to various embodiments, the skilled person will understand that various omissions, substitutions, permutations, and changes in the form and details of the methods and apparatus illustrated may be made without departing from the scope of the disclosure. These and other variations constitute embodiments of the described methods and apparatus.

Each practical and novel combination of the elements and alternatives described hereinabove, and each practical combination of equivalents to such elements, is contemplated as an embodiment of the present disclosure. Because many more element combinations are contemplated as embodiments of the disclosure than can reasonably be explicitly enumerated herein, the scope of the disclosure is properly defined by the appended claims rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art.

What is claimed is:

1. A method of making an electrode apparatus, adapted for use in an ultracapacitor energy storage device interface, comprising the operations of:
   (a.) forming a first carbon film element, having a top side and a bottom side;
   (b.) providing an electrode foil element having a first side and a second side;
   (c.) affixing the first carbon film element onto the electrode foil element, such that the bottom side of the first carbon film element is affixed to the first side of the electrode foil element; and (d.) punching the first carbon film element and the electrode foil element, such that a plurality of cavities extend through the first carbon film element and the electrode foil element.

2. The method of making an ultracapacitor energy storage device electrode apparatus of claim 1, the method further comprising:
  (e.) forming a second carbon film element having a top side and a bottom side; and
  (f.) affixing the second carbon film element onto the electrode foil element, such that the top side of the second carbon film element is affixed to the second side of the electrode foil element,
  wherein the plurality of cavities extend through the first carbon film element, the electrode foil element, and the second carbon film element.

3. The method of making the ultracapacitor energy storage device electrode apparatus of claim 2, wherein the energy storage device further comprises an electrolytic solution.

4. The method of making the electrode apparatus of claim 1, wherein the ultracapacitor energy storage device further comprises a battery element.

5. The method of making the electrode apparatus of claim 1, wherein the plurality of cavities comprises a plurality of channels.

6. An electrode structure adapted for use in an ultracapacitor energy storage device, comprising:
  (a.) a first carbon film element, having a top side and a bottom side;
  (b.) an electrode foil element, having a first side and a second side, wherein the first carbon film element bottom side is affixed to the first side of the electrode foil element; and
  (c.) a plurality of cavities extending through the first carbon film element and the electrode foil element.

7. The electrode structure of claim 6, further comprising:
  (d.) a second carbon film element having a top side and a bottom side, the second carbon film affixed to the second side of the electrode foil element,
  wherein the plurality of cavities extend through the first carbon film element, the electrode foil element, and the second carbon film element.

8. The electrode structure of claim 7, wherein the ultracapacitor energy storage device further comprises an electrolytic solution.

9. The electrode structure of claim 6, wherein the ultracapacitor energy storage device further comprises an electrolytic solution.

10. The electrode structure of claim 6, wherein the ultracapacitor energy storage device further comprises a battery element.

11. The electrode structure of claim 6, wherein the plurality of cavities comprises a plurality of channels.

12. An article of manufacture comprising an electrode apparatus adapted for use in an ultracapacitor energy storage device, comprising:
  (a.) a first carbon film element comprising, a top side, and a bottom side;
  (b.) an electrode foil element having a first side and a second side, wherein the first carbon film element bottom side is operatively connected to the first side of the electrode foil element, and;
  (c.) a second carbon film element comprising, a top side, and a bottom side, wherein the second carbon film element top side is operatively connected to the second side of the electrode foil element; and
  (d.) a plurality of cavities extending through the first carbon film element, the electrode foil element, and the second carbon film element.

13. The article of manufacture of claim 12, wherein the ultracapacitor energy storage device comprises an electrolytic solution.

14. The article of manufacture of claim 12, wherein the ultracapacitor energy storage device further comprises a battery element.

15. The article of manufacture of claim 12, wherein the plurality of cavities align axially through the first carbon element, the electrode foil element, and the second carbon element.

* * * * *

UNITED STATES PATENT AND TRADEMARK OFFICE
CERTIFICATE OF CORRECTION

PATENT NO.        : 7,580,243 B2
APPLICATION NO.   : 11/457651
DATED             : August 25, 2009
INVENTOR(S)       : Adrian Schneuwly It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 187 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,580,243 B2
APPLICATION NO. : 11/457651
DATED : August 25, 2009
INVENTOR(S) : Adrian Schneuwly, Linda Zhong and Xiaomei Xi It is certified that error appears in the above-identified patent and that said Letters Patent is hereby corrected as shown below:

Title Page; please add:
Item (75), Inventors: Linda Zhong, San Diego, CA (US); Xiaomei Xi, Carlsbad, CA (US)

Signed and Sealed this
Seventeenth Day of May, 2011

David J. Kappos
*Director of the United States Patent and Trademark Office*